US011685332B2

(12) United States Patent
Kim et al.

(10) Patent No.: US 11,685,332 B2
(45) Date of Patent: Jun. 27, 2023

(54) VEHICLE AIRBAG (71) Applicant: ZF Passive Safety Systems US Inc., Washington Township, MI (US)

(72) Inventors: Young Kim, Rochester Hills, MI (US); Jason Bare, Macomb, MI (US)

(73) Assignee: ZF Passive Safety Systems US Inc., Washington Township, MI (US)

( * ) Notice: Subject to any disclaimer, the term of this patent is extended or adjusted under 35 U.S.C. 154(b) by 27 days.

(21) Appl. No.: 16/558,451

(22) Filed: Sep. 3, 2019

(65) Prior Publication Data

US 2021/0061214 A1 Mar. 4, 2021

(51) Int. Cl.
| | |
|---|---|
| *B60R 21/232* | (2011.01) |
| *B60R 21/231* | (2011.01) |
| *B60R 21/237* | (2006.01) |
| *B60R 21/213* | (2011.01) |
| *B60R 21/2338* | (2011.01) |
| *B60R 21/00* | (2006.01) |

(52) U.S. Cl.
CPC .......... *B60R 21/232* (2013.01); *B60R 21/213* (2013.01); *B60R 21/237* (2013.01); *B60R 21/23138* (2013.01); *B60R 21/2338* (2013.01); *B60R 2021/0006* (2013.01)

(58) Field of Classification Search
CPC ................ B60R 21/232; B60R 21/237; B60R 21/23138; B60R 21/213; B60R 2021/0006; B60R 21/2338
See application file for complete search history.

(56) References Cited

U.S. PATENT DOCUMENTS

| | | | |
|---|---|---|---|
| 5,884,937 A | 3/1999 | Yamada | |
| 6,000,715 A | 12/1999 | Tschaeschke | |
| 6,338,498 B1* | 1/2002 | Niederman | ........... B60R 21/213 |
| | | | 280/728.2 |
| 6,481,743 B1* | 11/2002 | Tobe | ..................... B60R 21/232 |
| | | | 280/728.2 |
| 6,644,687 B2 | 11/2003 | Saito et al. | |
| 7,481,454 B2* | 1/2009 | Sunabashiri | ...... B60R 21/23184 |
| | | | 280/730.2 |
| 7,500,694 B2* | 3/2009 | Heudorfer | ............. B60R 21/232 |
| | | | 280/729 |

(Continued)

*Primary Examiner* — Paul N Dickson
*Assistant Examiner* — Caitlin Anne Miller
(74) *Attorney, Agent, or Firm* — Tarolli, Sundheim, Covell & Tummino L.L.P.

(57) ABSTRACT

An airbag system for a vehicle body includes an inflator and an airbag wherein the inflator is mounted on the vehicle body. The airbag includes a plurality of mounting portions, an inflatable main portion and a supplemental portion integral to the inflatable main portion at an upper edge of the inflatable main portion. The inflatable main portion includes an outboard interface side and an inboard engagement side while the supplemental portion includes an outboard vehicle side and an inboard interface side which is disposed adjacent to a portion of the outboard interface side of the inflatable main portion. The inflatable main portion is configured to deploy inboard of a vehicle window while the supplemental portion is configured to deploy between an upper region of the inflatable main portion and an upper vehicle rail thereby urging an upper region of the inflatable main portion toward an inboard direction.

13 Claims, 7 Drawing Sheets

(56) References Cited

U.S. PATENT DOCUMENTS

| | | | |
|---|---|---|---|
| 7,641,228 B2* | 1/2010 | Mansson | B60R 21/21 280/730.2 |
| 8,020,888 B2* | 9/2011 | Cheal | B60R 21/213 280/730.2 |
| 8,025,309 B2 | 9/2011 | Steinbach et al. | |
| 8,414,021 B2* | 4/2013 | Tanaka | B60R 21/232 280/730.2 |
| 8,585,080 B2* | 11/2013 | Trevena | B60R 21/232 280/730.2 |
| 8,596,675 B2 | 12/2013 | Kwon et al. | |
| 8,746,734 B1* | 6/2014 | Smith | B60R 21/239 280/730.2 |
| 9,126,558 B2 | 9/2015 | Kawamura et al. | |
| 9,266,494 B2 | 2/2016 | Wang | |
| 2002/0096864 A1 | 7/2002 | Asano et al. | |
| 2003/0111828 A1* | 6/2003 | Dominissini | B60R 21/232 280/730.2 |
| 2003/0178831 A1 | 9/2003 | Roberts et al. | |
| 2004/0130128 A1* | 7/2004 | Bakhsh | B60R 21/232 280/730.2 |
| 2006/0157958 A1* | 7/2006 | Heudorfer | B60R 21/233 280/730.2 |
| 2007/0001433 A1* | 1/2007 | Gu | B60R 21/232 280/730.2 |
| 2008/0054606 A1* | 3/2008 | Mitsuo | B60R 21/232 280/730.2 |
| 2010/0013198 A1* | 1/2010 | Karlsson | B60R 21/214 280/728.2 |
| 2010/0264630 A1* | 10/2010 | Walston | B60R 21/213 280/730.2 |
| 2011/0079990 A1* | 4/2011 | Cheal | B60R 21/233 280/730.2 |
| 2014/0239621 A1* | 8/2014 | Kawamura | B60R 21/232 280/730.2 |
| 2017/0088084 A1* | 3/2017 | Kawamura | B60R 21/237 |
| 2020/0108791 A1* | 4/2020 | Ohno | B60R 21/213 |
| 2021/0009071 A1* | 1/2021 | Valles Rey | B60R 21/213 |

* cited by examiner

VEHICLE AIRBAG

TECHNICAL FIELD

The present disclosure relates to automotive safety. More specifically, the present disclosure relates to inflatable airbags and methods that provide enhanced protection for collisions

BACKGROUND

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of a charge contained within an inflator. Expanding gases from the charge travel through conduits and fill the airbags, which immediately inflate in front of the driver and passenger to protect them from harmful impact with the interior of the car. Typically, airbags are concealed within the vehicle trim to be invisible during normal vehicle operation.

Airbag systems have also been developed in response to the need for similar protection from lateral impacts between a passenger and the side of a vehicle's interior. This might occur when another vehicle collides with the side of the car, or in a rollover situation where the side of car is repeatedly impacting the ground. Side impact airbags are often called "inflatable curtains." Many inflatable curtains are stowed along the corner where the vehicle roof meets the side windows and pillars. These inflatable curtains may be stowed behind the headliner trim at the edge of the headliner, which is the fabric covering the roof of the vehicle.

Safety standards issued by various governments require more comprehensive protection in the event of a side or frontal collision. Additionally, there is an ongoing need to provide airbag systems that are economical to manufacture and install, avoid interference with the ability of the automaker to position various features on the vehicle interior, and can be expected to deploy reliably. The passengers of a vehicle may be at any of a wide variety of positions within the vehicle at the time of deployment, so it is desirable to provide airbag systems that protect against impact over the broadest possible range of occupant locations.

It has been observed that some existing inflatable curtain designs do not provide adequate protection in the event of certain collision events, such as rollover collisions. In a rollover collision, the position and trajectory of vehicle occupants is difficult to predict. Accordingly, known inflatable curtains designed to protect against a pure lateral impact may not be in the proper position to provide much needed protection to a vehicle passenger's head. The result may be injuries from impact with interior vehicle surfaces and/or ejection from the vehicle, despite deployment of the airbag systems.

The above information disclosed in this Background section is only for enhancement of understanding of the background of the disclosure, and therefore, it may contain information that does not form the prior art that is already known in this country to a person of ordinary skill in the art. Accordingly, there is a need for an inflatable vehicle airbag which will provide adequate support to a vehicle passenger's head in the event of a side impact, offset, angular and/or roll-over collision.

SUMMARY

The present disclosure relates to an airbag system for a vehicle body having an inflator mounted on a vehicle body and an airbag which is in fluid communication with the inflator. The airbag includes a plurality of a plurality of mounting portions configured to attach to the vehicle body via a plurality of fasteners and configured to anchor the airbag to the vehicle body. The airbag also includes an inflatable main portion integral to the plurality of mounting portions and a supplemental portion. The inflatable main portion is formed by an outboard interface side and an inboard engagement side. The supplemental portion may be integral to the inflatable main portion at an upper edge of the inflatable main portion. The supplemental portion is formed by an outboard vehicle side and an inboard interface side which is disposed adjacent to a portion of the outboard interface side of the inflatable main portion. The inflatable main portion of the airbag is configured to deploy inboard of a vehicle window while the supplemental portion is configured to deploy between an upper region of the inflatable main portion and an upper vehicle rail so as to urge an upper region of the inflatable main portion toward an inboard/central direction thereby supporting the vehicle passenger by providing increased stiffness in the upper region of the airbag and preventing the vehicle passenger from coming into contact with a front or rear pillar of the vehicle.

When the airbag is deployed, the inboard engagement side of the inflatable main portion as described above is a smooth continuous surface which supports the head of passengers of varying heights while simultaneously urging a vehicle passenger toward the inboard/central region of the vehicle so as to prevent the passenger from inadvertently contacting a front (or rear) pillar of the vehicle. Similarly, when the airbag is deployed, the inboard engagement side of the inflatable main portion may, but not necessarily, be disposed at an acute angle relative to a roofline of the vehicle when the inflatable main portion and the supplemental portion are fully deployed.

In the various embodiments of the present disclosure, the inboard interface side of the supplemental portion is adjacent to an upper portion of the outboard interface side of the inflatable main portion when the airbag is in a folded, stowed position. Similarly, in the various embodiments of the present disclosure, the inboard interface side of the supplemental portion is disposed adjacent to a portion of the outboard interface side of the inflatable main portion when the airbag is in a deployed position. It is understood that the supplemental portion and the inflatable main portion of the airbag are fully expanded via the inflator when the airbag is in the deployed position.

Figure 2:
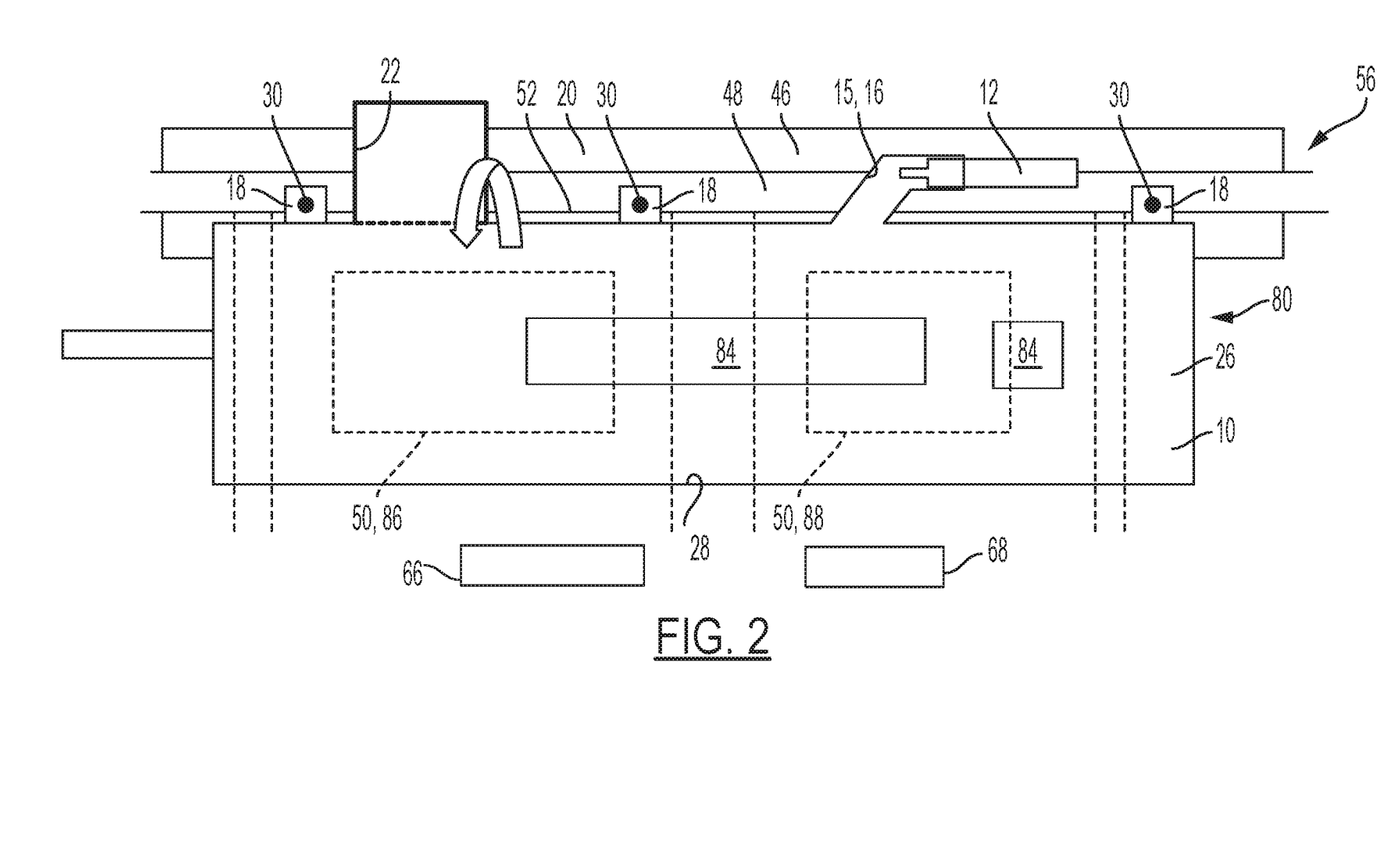
FIG. 2 illustrates an example, non-limiting airbag system according to various embodiments of the present disclosure.
Figure 3:
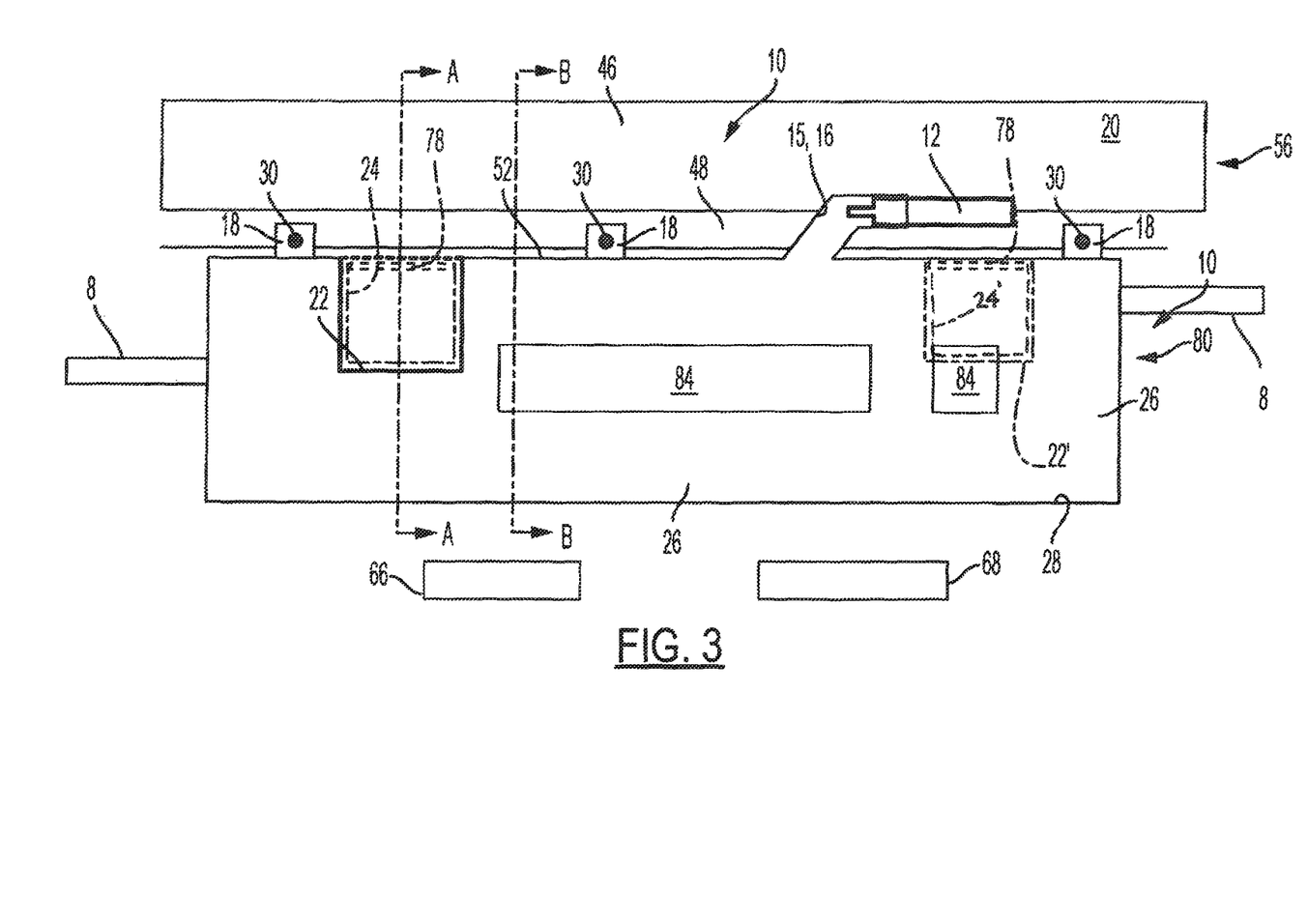
FIG. 3 illustrates the example, non-limiting airbag system of FIG. 2 with the supplemental portion disposed adjacent to the inflatable main portion.

The supplemental portion of the airbag maybe disposed proximate to a front passenger row of the vehicle body so as to support the head of a front passenger in a side impact, offset, angular, or roll-over collision and to provide increased stiffness in the upper region of the airbag. Given that the supplemental portion of the airbag may be slightly forward of the front passenger row (as shown in FIGS. 2-3), the inflated airbag prevents the front passenger from coming into contact with the front pillar (A-pillar) of the vehicle. However, it is also understood that an optional secondary supplemental portion may be further provided and disposed proximate to a second row of the vehicle (slightly rearward of the second row) so as to support the passenger in a collision and to prevent the rear passenger from coming into contact with a rear pillar of the vehicle body. The secondary supplemental portion may also be in fluid communication with the inflatable main portion, the gas inflator, and the supplemental portion.

In yet another embodiment of the present disclosure, an airbag for a vehicle body may include an inflatable main portion and a supplemental portion integral to the inflatable main portion wherein the supplemental portion is folded against the inflatable main portion at an upper edge of the inflatable main portion. The supplemental portion may be integral to the inflatable main portion and may be folded against the inflatable main portion at an upper edge of the inflatable main portion. The inflatable main portion includes an outboard interface side and an inboard engagement side. The supplemental portion includes an outboard vehicle side and an inboard interface side which is disposed adjacent to a portion of the outboard interface side of the inflatable main portion when the airbag is in the stowed, folded position as well as when the airbag is in the deployed, expanded position.

The airbag of the present disclosure may further include a plurality of mounting portions integral to or affixed to the upper edge of the inflatable main portion wherein the plurality of mounting portions are configured to anchor the airbag to a vehicle body via a plurality of fasteners. When the inflator is actuated, the inflatable main portion of the airbag is configured to deploy inboard of a vehicle window while the supplemental portion of the airbag is configured to deploy between an upper region of the inflatable main portion and an upper roof rail so as to urge an upper region of the inflatable main portion toward an inboard direction. In the airbag embodiment of the present disclosure, the airbag may, but not necessarily, be a side curtain airbag. However, the airbag may also be a front airbag.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a." "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause: other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Preferred embodiments of the present disclosure are described below with reference to the accompanying drawings. However, the disclosure is not limited to the embodiments disclosed herein. All modifications within the appended claims and equivalents relative thereto are intended to be encompassed in the scope of the claims.

Figure 1A:
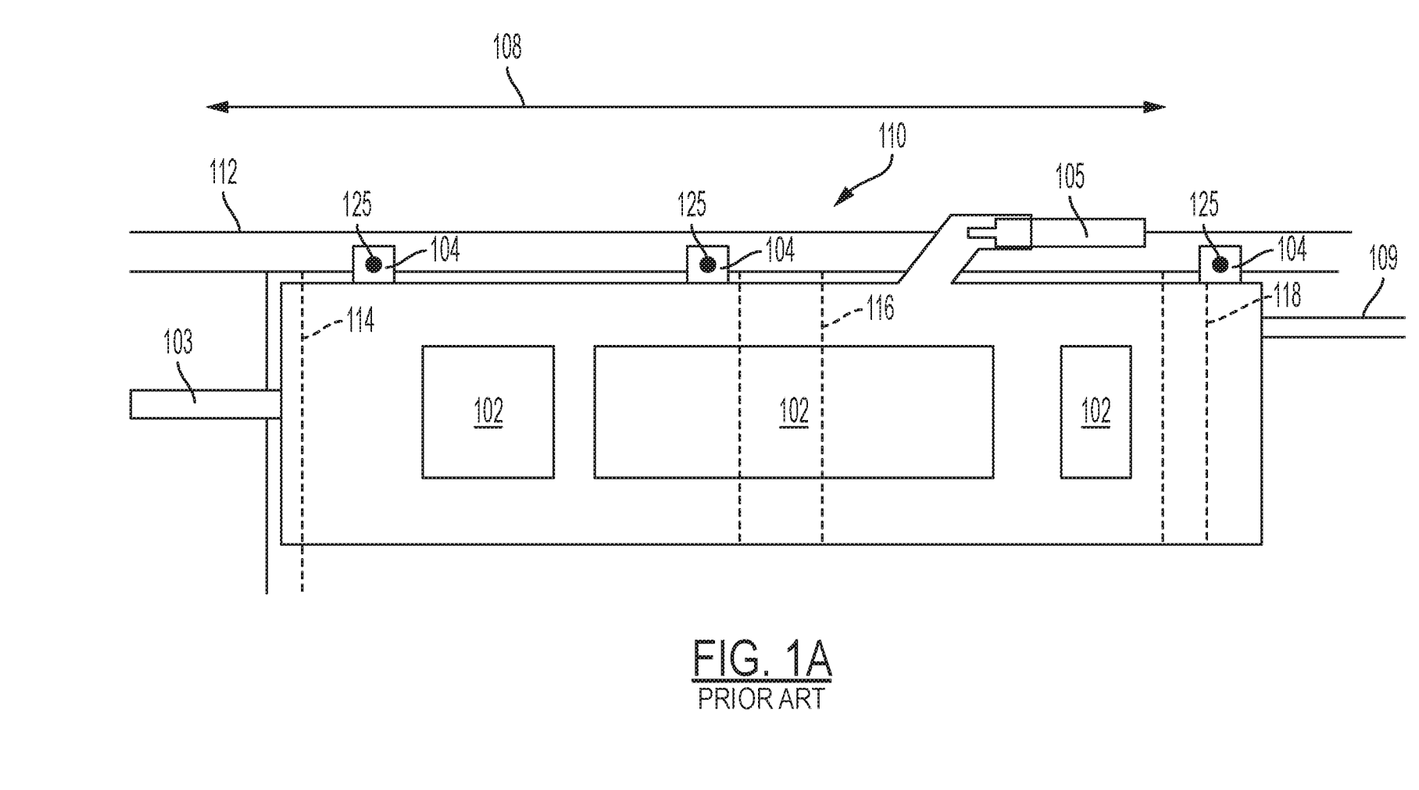
FIG. 1A illustrates a traditional side airbag curtain for a vehicle in a deployed position.

With reference to FIG. 1A, the inflatable curtain airbag 110 may extend along the longitudinal direction 108 within the vehicle. The inflatable curtain airbag 110 may be coupled to or next to a roof rail 112 of the vehicle. The airbag assembly 100 may also include a forward tether 103 and a rearward tether 109 that are coupled proximate the front and rear ends, respectively, of the inflatable curtain airbag 110. Upon inflation of the inflatable curtain airbag 110, the forward tether 103 and the rearward tether 109 may provide tension that helps keep the inflatable curtain airbag 110 in place.

In the event of a collision, a traditional inflatable curtain airbag 110 may expand downward along the side of the vehicle between the vehicle passengers and one or more lateral surfaces of the vehicle such as the side windows and pillars (the structures between the lateral windows and/or the windshield and rear window) of the vehicle. Regions 102 of the airbag 110 are not inflated when the airbag is deployed. The pillars may include an A-pillar 114, a B-pillar 116, a C-pillar 118, and, if present, a D-pillar (not shown), all of which may join the roof rail 112 at their upper ends. In some embodiments such as that illustrated in FIG. 1, an inflatable curtain airbag 110 may extend from an A-pillar 114 to a C-pillar 118 of the vehicle. In other embodiments, the inflatable curtain airbag 110 may extend from the A-pillar 114 to a D-pillar (not shown) of the vehicle.

The inflatable curtain airbag 110 may normally reside in a stowed configuration (see FIG. 5), in which the inflatable curtain airbag 110 is concealed behind the interior trim of the vehicle, such as the lateral headliner trim (the trim that covers the edges of the headliner, which is typically a sheet of fabric that covers the interior of the vehicle roof). Prior to installation in the vehicle, the inflatable curtain airbag 110 may be compacted into the stowed configuration, such as by rolling, folding, or a combination thereof, such that the inflatable curtain airbag 110 assumes an elongated shape extending along a pathway with a length that is much greater than the height or width of its cross-sectional shape.

Once compacted into the stowed configuration, the inflatable curtain airbag 110 may be retained in the stowed configuration through the use of wrappers, fasteners, or the like to facilitate shipping and installation. The inflatable curtain airbag 110 may be secured to the vehicle proximate the roof rail 112. In the embodiment of FIG. 1, integrated wrappers and fastening systems may be provided in the form of a plurality of mounting locations 104 distributed along the length of the inflatable curtain airbag 110. Each mounting member 104 may be provided in the form of a tab 104 secured to the inflatable curtain airbag 110 wherein a fastener 125 secures the tab 104 (and curtain airbag 110) to the roof rail 112. A wrapper (not shown) may encircles the inflatable curtain airbag 110 to keep the inflatable curtain airbag 110 in the stowed (folded or rolled) configuration until deployment.

Figure 1B:
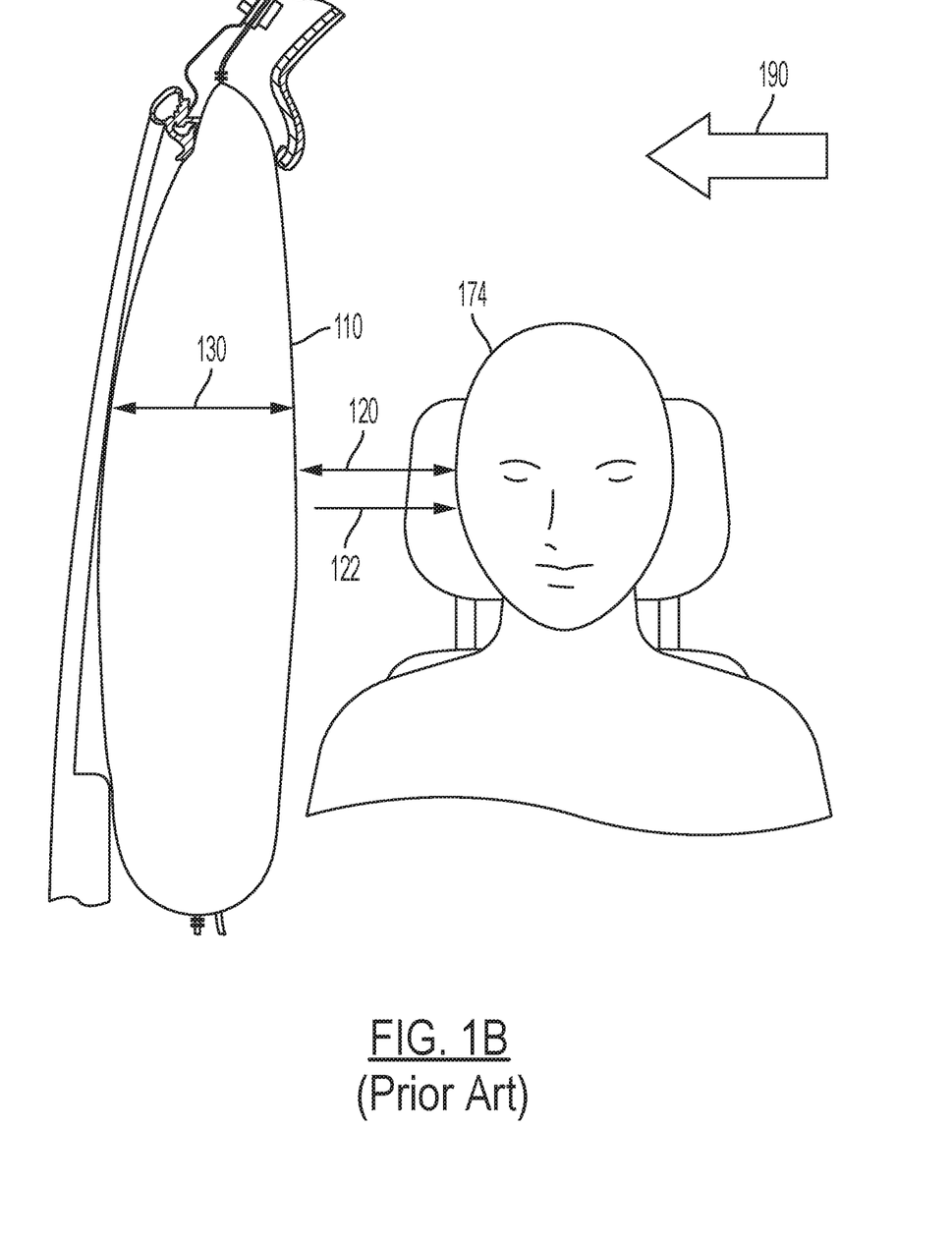
FIG. 1B illustrates the traditional side airbag curtain relative to a vehicle occupant along lines A-A of FIG. 1A.

However, a traditional airbag curtain 110 as shown in FIG. 1B generally has a substantially uniform thickness 130 when the airbag 110 is deployed and may not adequately protect a passenger's head in the event of a side impact given the unpredictable location of a vehicle passenger's head 174 due to varying passenger height or unpredictable passenger location in a collision. As shown in FIG. 1B, a substantial gap 120 between the occupant's head 174 and the traditional airbag curtain remains when the traditional airbag curtain 110 is deployed, thereby risking injury to the occupant since the occupant's head 174 remains unsupported, for example, in a lateral direction 122 when a load 190 is applied. Accordingly, undesirable occupant movement may occur wherein the passenger may undesirably come into contact with a (front) pillar of the vehicle.

Therefore, as shown in FIG. 2, a head-protecting airbag system 56 embodying the present disclosure is mounted on a vehicle body 48 with two side windows 86 and 88, i.e., with two rows of seats. The head-protecting airbag system 56 includes an airbag 10, an inflator 12, mounting brackets 14, and an airbag cover 76. (See FIG. 5) The airbag 10 may be housed on upper peripheries of the windows 50 on the inboard side 70 of the vehicle body 46 in a folded-up configuration, specifically from the lower periphery of a front pillar 96 through the region above a rear pillar 98, via the lower periphery of a roof side rail 48.

Referring again to FIG. 2, the airbag assembly 56 may include an inflator 12, a tube 15, and an inflatable curtain airbag 10 that receives gas from the inflator 12 via the tube 15. The airbag assembly 56 may also have a sensor and a control system (not shown) that detects a collision or impending collision and transmits an activation signal to the inflator 12. The inflator 12 may be one of several types, such as pyrotechnic, stored gas, or a combination inflator and may be a single or multistage inflator. The inflator 12 may be stored at any suitable location relative to the inflatable curtain airbag 10. If the inflator 12 is a pyrotechnic inflator, the inflator 12 may contain a propellant that ignites to rapidly produce inflation gas in response to receipt of the activation signal.

Figure 4A:
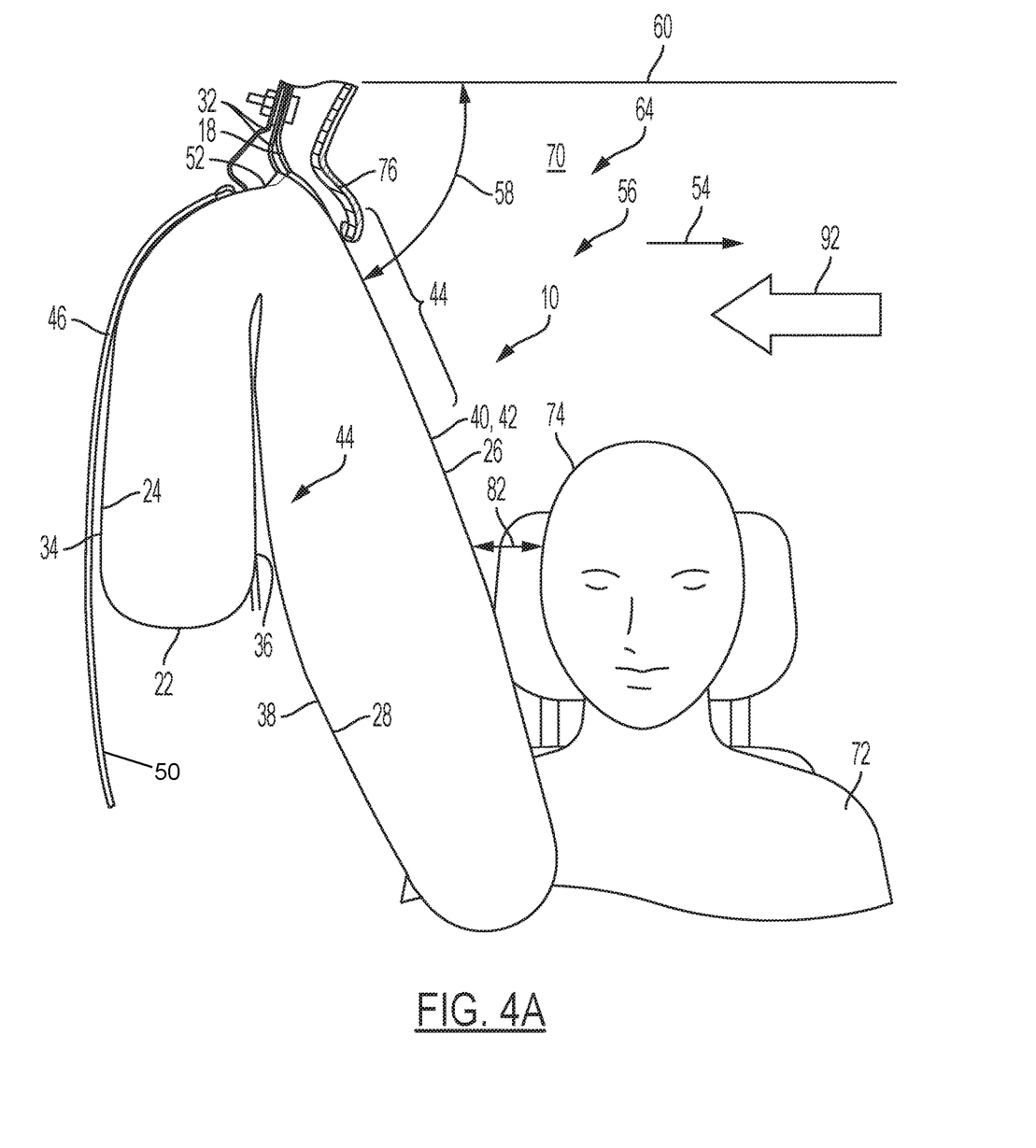
FIG. 4A illustrates the example, non-limiting airbag system of FIG. 3 when the airbag system is in deployed position in a cross-sectional view along lines A-A in FIG. 3.
Figure 4B:
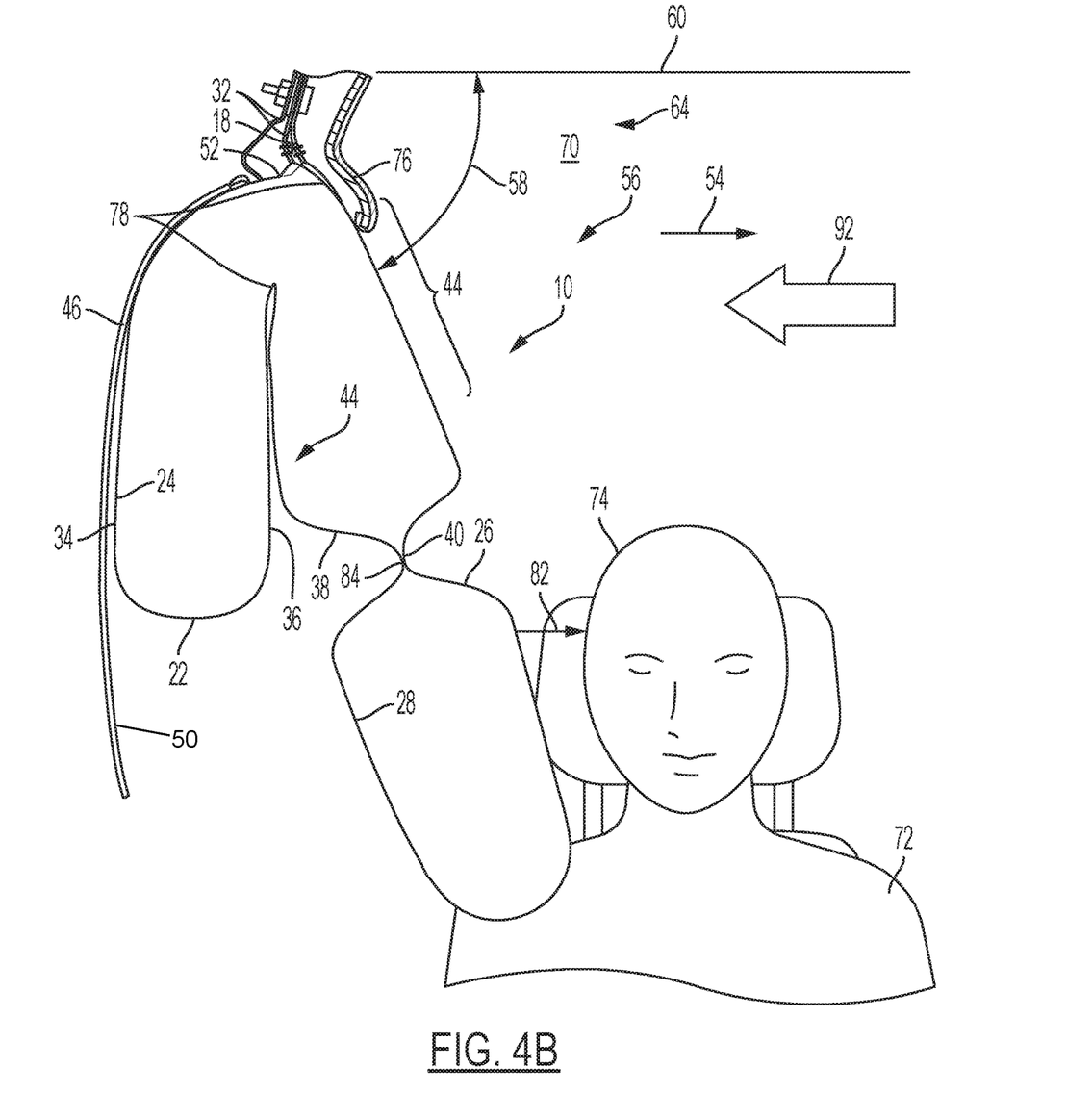
FIG. 4B illustrates the example, non-limiting airbag system of FIG. 3 when the airbag system is in deployed position in a cross-sectional view along lines B-B in FIG. 3.
Figure 5:
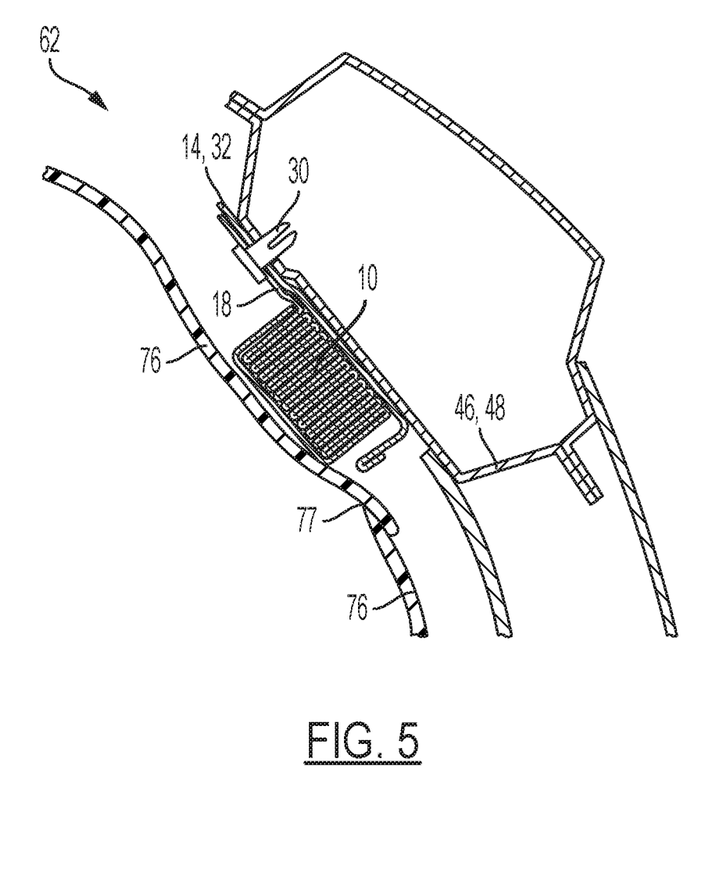
FIG. 5 illustrates an example, non-limiting airbag system of FIGS. 2-4A in a stowed position.

Referring to FIGS. 4A, 4B and 5, the airbag cover 76 may be formed of synthetic resin and secured to an inner panel of the vehicle body 48 structure at the front pillar and roof side rail 48. The airbag cover 76 covers the airbag 10 when the airbag 10 is in the stowed, folded position as shown in FIG. 5. The airbag cover 76 is openable at seam 77 (as shown in FIG. 5) toward an interior of the vehicle 46 when pushed by the airbag 10 under inflation (by the inflator 12) to allow for the deployment of the airbag 10 (see FIG. 4).

As shown in FIG. 2-3, the inflator 12 is substantially columnar in shape and includes at the leading end gas discharge ports (unillustrated) for feeding an inflation gas into the airbag 10. The inflator 12 is coupled to the airbag 10 by the leading end region having the gas discharge ports and inserted into a later-described connection port 16 of the airbag 10. A clamp (not shown) may be mounted around an end of the connection port 16 to clamp the connection port 16 onto the leading end region of the inflator 12. The inflator 12 is secured to the inner body panel above the window 50, 86 by a mounting bracket 14 mounted around the inflator 12 and mounting bolts 30 18. The inflator 12 is electrically connected with an unillustrated control of the vehicle body 46 via an unillustrated lead wire, and is so designed as to be actuated in response to an actuating signal fed from the control that has detected a side impact or a rollover of the vehicle body 46.

Mounting brackets 32 are used to mount the airbag 10 on the inner panel 20. Each of the mounting brackets 32 is comprised of a pair of plates of metal 32, which are applied to inboard and outboard sides of each of later-described mounting portions 18 of the airbag 10. Mounting bolts 30 secure the mounting brackets 32 (see FIGS. 4A-4B, 5), together with the mounting portions 18, to the inner panel 20 (see FIG. 5).

As shown in FIGS. 2-3, the airbag 10 includes a supplemental portion 22 which defines a supplemental chamber 24. The airbag 10 also includes an inflatable main portion 26 which defines a main chamber 28 which is in fluid communication with the supplemental chamber 24 and the inflator 12. The supplemental portion 22, the main portion 26 and the inflator 12 are in fluid communication with each other via the corresponding supplemental chamber 24 and main chamber 28. As shown in FIGS. 4A-4B, the main portion 26 and the supplemental portion 22 are configured to expand when the inflator 12 is actuated/ignited. The inboard engagement surface 40 of the main portion 26 may also be referenced as the continuous engagement surface which supports the vehicle occupant's head (together with the supplemental portion 22) regardless of his/her height or his/her position in a collision and provides increased stiffness in the upper region of the airbag (slightly forward of the front passenger where the supplemental portion is positioned) so as to prevent a passenger from coming into contact with a pillar of the vehicle—regardless of the type of collision (a side impact, offset, angular and/or roll-over).

Accordingly, the improved airbag mitigates undesirable occupant movement in a collision. As also shown in FIGS. 4A-4B, the supplemental portion 22 and the main portion 26 are each defined by an inboard side and an outboard side as described in more detail below. It is understood that the inboard side of the supplemental portion 22 is disposed adjacent to (and against) the outboard side of the main portion 26 regardless of whether the airbag 10 is stowed (see FIG. 5) or deployed (see FIGS. 4A-4B).

Accordingly, the present disclosure relates to an airbag system 56 for a vehicle body 48 having an inflator 12 mounted on a vehicle body 48 and an airbag which is in fluid communication with the inflator 12. The airbag 10 includes a plurality of mounting portions 18 configured to attach to the vehicle body 48 via a plurality of fasteners 30 and configured to anchor the airbag 10 to the vehicle body 48. The airbag also includes an inflatable main portion 26 integral to the plurality of mounting portions 18 and a supplemental portion 22. The inflatable main portion 26 is formed by an outboard interface side 38 and an inboard engagement side 40. The supplemental portion 22 may be integral to the inflatable main portion 26 at an upper edge 52 of the inflatable main portion 26. The supplemental portion 22 is formed by an outboard vehicle side 34 and an inboard interface side 36 which is disposed adjacent to a portion of the outboard interface side 38 of the inflatable main portion 26. The inflatable main portion 26 of the airbag is configured to deploy inboard of a vehicle window 50 while the supplemental portion 22 is configured to deploy between an upper region 44 of the inflatable main portion 26 and an upper vehicle rail 48 so as to urge an upper region 44 of the inflatable main portion 26 toward an inboard direction 54 thereby supporting the head of a vehicle passenger 72 in the event of a side impact, offset, angular and/or roll-over collision.

When the airbag 10 is deployed, the inboard engagement side 40 of the inflatable main portion 26 as described above is a smooth continuous surface 42 which supports the head 78 of passengers 72 of varying heights or in various positions as load 92 is applied in a collision. Similarly, when the airbag 10 is deployed, the inboard engagement side 40 of the inflatable main portion 26 is disposed at an acute angle 58 relative to a roofline 60 of the vehicle body 46 when inflatable main portion 26 and the supplemental portion 22 are fully deployed.

In the various embodiments of the present disclosure, the inboard interface side 36 of the supplemental portion 22 is adjacent to (or disposed against) an upper region 44 of the outboard interface side 38 of the inflatable main portion 26 when the airbag 10 is in a folded, stowed position 62. Similarly, as previously indicated, in the various embodiments of the present disclosure, the inboard interface side 36 of the supplemental portion 22 is disposed adjacent to a portion of the outboard interface side 38 of the inflatable main portion 26 when the airbag 10 is in a deployed position 64. It is understood that the supplemental portion 22 and the inflatable main portion 26 of the airbag 10 are fully expanded via the inflator 12 when the airbag is in the deployed position 64 as shown in FIGS. 4A-4B.

Referring now to FIG. 2, the supplemental portion 22 of the airbag 10 may be disposed proximate to a front passenger 72 row of the vehicle body 48 so as to support the head 74 of a front passenger 72 in a collision. However, it is also understood that a secondary supplemental portion 22' may be further provided and disposed proximate to a second row 68 of the vehicle body 46 (slightly rearward of the second row 68) so as to support the head of a rear passenger in a collision and prevent the rear passenger from coming into contact with a rear vehicle pillar (see element 98 in FIG. 2). The secondary supplemental portion 22' and the associated secondary supplemental chamber 24' may also be in fluid communication with the inflatable main portion 26 (and main chamber 28), the gas inflator 12, and the supplemental portion 22 (and supplemental chamber 24).

In yet another embodiment of the present disclosure and referring again to FIGS. 2-3, an airbag 10 may be provided for a vehicle body 48 which may include an inflatable main portion 26 and a supplemental portion 22 integral to the inflatable main portion 26 wherein the supplemental portion 22 is folded against the inflatable main portion 26 at an upper edge 52 of the inflatable main portion 26. Passageway 78 is defined between the supplemental chamber 24 and main chamber 28 wherein passageway 78 is proximate to the upper edge 52 of the main portion. The supplemental portion 22 may be integral to the inflatable main portion 26 and may be folded against the inflatable main portion 26 at an upper edge 52 of the inflatable main portion 26 as shown in FIGS. 3-4.

Referring now to FIGS. 4A-4B, the inflatable main portion 26 of the airbag includes an outboard interface side 38 and an inboard engagement side 40. The supplemental portion 22 includes an outboard vehicle side 34 and an inboard interface side 36 which is disposed adjacent to a portion of the outboard interface side 38 of the inflatable main portion 26 when the airbag is in the stowed, folded position 62 as well as when the airbag 10 is in the deployed, expanded position 64. FIG. 4B illustrates the cross-sectional view along line B-B in FIG. 3 where the internal tether 84 (or uninflated region 84) is shown while FIG. 4A illustrates the cross-sectional view along line A-A in FIG. 3.

Referring back to FIGS. 2-3, the airbag 10 of the present disclosure may further include a plurality of mounting portions 18 integral to or affixed to the upper edge 52 of the inflatable main portion 26 wherein the plurality of mounting portions 18 are configured to anchor the airbag to a vehicle body 48 via a plurality of fasteners 30. When the inflator 12 is actuated, the inflatable main portion 26 of the airbag is configured to deploy inboard of a vehicle window while the supplemental portion 22 of the airbag is configured to deploy between an upper region 44 of the inflatable main portion 26 and an upper roof rail 48 so as to urge an upper region 44 of the inflatable main portion 26 toward an inboard direction 54. In the airbag embodiment of the present disclosure, the airbag 10 may, but not necessarily, be a side curtain airbag 80. However, the airbag may also be a front airbag (not shown).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A curtain airbag system for helping to protect an occupant of a vehicle, the curtain airbag system comprising:
   an inflator configured to be mounted on or near a roof rail of the vehicle; and
   a curtain airbag in fluid communication with the inflator, the curtain airbag comprising:
   an upper edge comprising a plurality of mounting portions spaced along its length and configured to be connected via fasteners to the roof rail of the vehicle;
   an inflatable main portion that extends the entire length of the curtain airbag, the main portion comprising an inflatable main chamber, the main portion being defined at an upper extent by the upper edge of the curtain airbag and at a lower extent by a lower edge that defines the lowermost extent of the curtain airbag; and
   supplemental portions that extend along portions of the length of the curtain airbag corresponding to seating rows of the vehicle, the supplemental portions comprising inflatable supplemental chambers, the supplemental portions being defined at their upper extents by the upper edge of the curtain airbag and at their lower extents by lower edges of the supplemental portions, the lower edges of the supplemental portions being configured to terminate vertically above the lower edge of the main portion of the curtain airbag,
   wherein the inflator and curtain airbag are configured so that the inflator directs inflation fluid into both the main chamber and the supplemental chamber so that the main portion and supplemental portion deploy in a downward direction away from the roof rail along a side structure of the vehicle, the supplemental portion being configured to deploy between the main portion and the side structure,
   wherein the curtain airbag comprises a connection port along the upper edge of the curtain airbag for receiving the inflator and directing inflation fluid from the inflator into the main chamber and supplemental chamber from the upper edge of the curtain airbag, and
   wherein the inflator directs inflation fluid through the connection port into the main and supplemental chambers at the same time so that the main and supplemental chambers inflate and deploy simultaneously.

2. The curtain airbag system recited in claim 1, wherein the main portion is configured to extend vertically below a headrest of an adjacent vehicle seat, and wherein the supplemental portions are configured so that the supplemental chamber is configured to extend no lower than the headrest of the adjacent vehicle seat.

3. The curtain airbag system recited in claim 1, wherein the upper edge defines the upper bounds of the main chamber and the supplemental chambers.

4. The curtain airbag system recited in claim 1, wherein main portion includes an outboard interface side and an inboard engagement side, and the supplemental portion includes an outboard vehicle side and an inboard interface side, wherein the outboard vehicle side of the supplemental portion engages the vehicle side structure when inflated and deployed, wherein the outboard interface side of the main portion and the inboard interface side of the supplemental portion engage each other when inflated and deployed, and wherein the inboard engagement side of the main portion is configured to face the occupant when inflated and deployed.

5. The curtain airbag system recited in claim 4, wherein the inboard engagement side of the main portion is a smooth continuous surface.

6. The curtain airbag system recited in claim 1, wherein deployment of the supplemental portion urges the main portion inboard at an angle so that the inboard engagement side of the main portion extends inboard at an acute angle relative to a roofline of the vehicle.

7. The curtain airbag system recited in claim 6, wherein the angle at which the supplemental portion urges the main portion is such that the main portion, unrestricted, extends inboard in front of the occupant's torso.

8. The curtain airbag system recited in claim 4, wherein the inboard interface side is adjacent to an upper portion of the outboard interface side of the inflatable main portion when the airbag is in a folded, stowed position.

9. The curtain airbag system recited in claim 4, wherein the inboard interface side of the supplemental portion is disposed adjacent to a portion of the outboard interface side of the inflatable main portion when the airbag is in a deployed position.

10. The curtain airbag system recited in claim 4, wherein the supplemental portion and the inflatable main portion are fully expanded when the airbag is in the deployed position.

11. The curtain airbag system recited in claim 1, wherein the supplemental portion is disposed proximate to a front row of the vehicle body.

12. The curtain airbag system recited in claim 1, wherein a first supplemental portion is disposed proximate to a front seating row of the vehicle, and a second supplemental portion is disposed proximate to a second seating row of the vehicle.

13. The curtain airbag system recited in claim 1, wherein deployment of supplemental portion between the main portion and the side structure causes a lower portion of the main portion to deploy in the inboard direction to a position that is spaced from adjacent portions of the vehicle side structure.

* * * * *